April 18, 1944.  S. C. PETRILLI  2,347,164
APPARATUS FOR COATING CANDY
Filed Dec. 29, 1941  4 Sheets-Sheet 1

INVENTOR.
Santy C. Petrilli
BY: Cox Moore & Olson
attys.

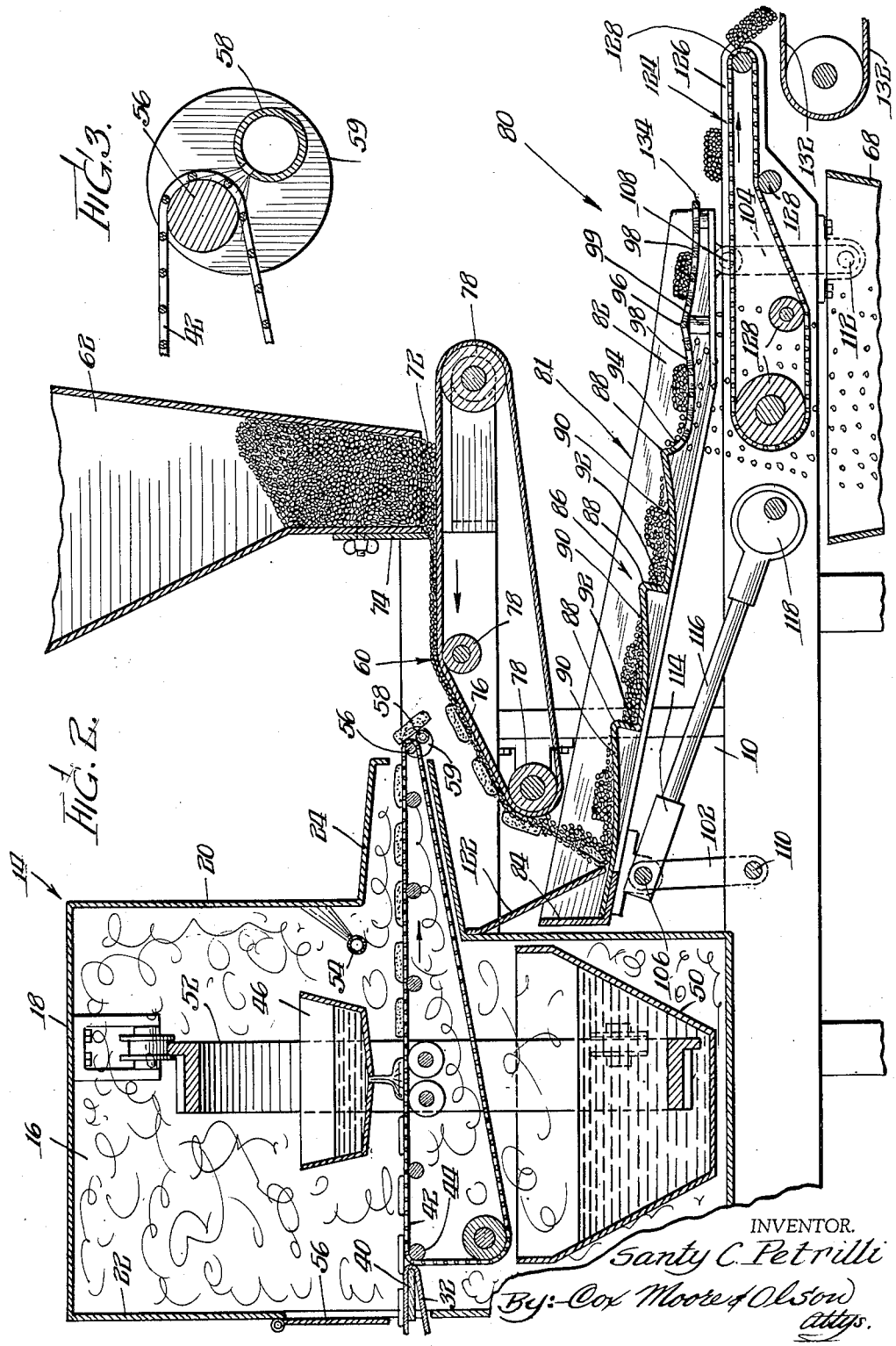

April 18, 1944. S. C. PETRILLI 2,347,164
APPARATUS FOR COATING CANDY
Filed Dec. 29, 1941 4 Sheets-Sheet 3
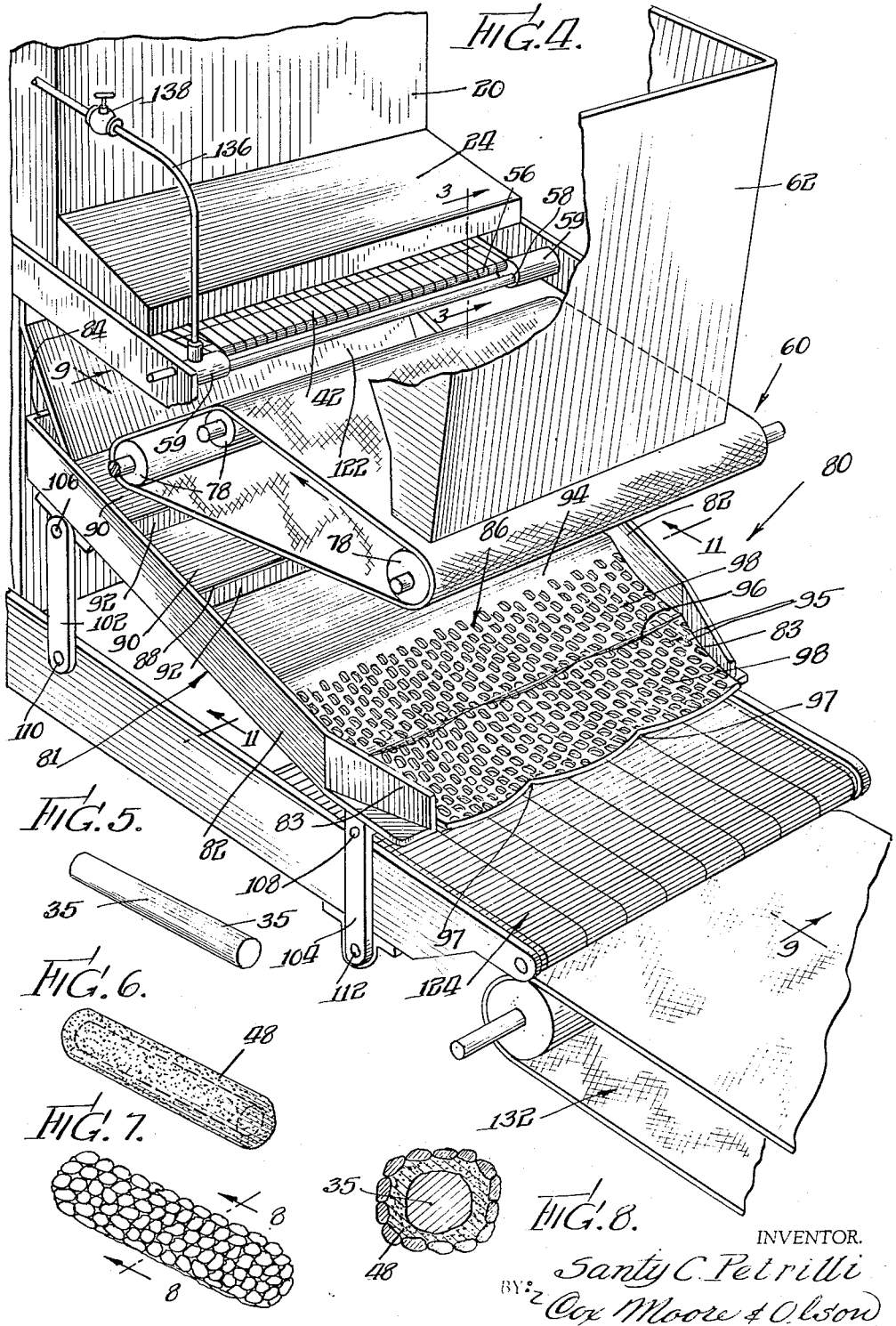
INVENTOR.
Santy C. Petrilli
BY Cox Moore & Olson
attys April 18, 1944. S. C. PETRILLI 2,347,164
APPARATUS FOR COATING CANDY
Filed Dec. 29, 1941 4 Sheets-Sheet 4
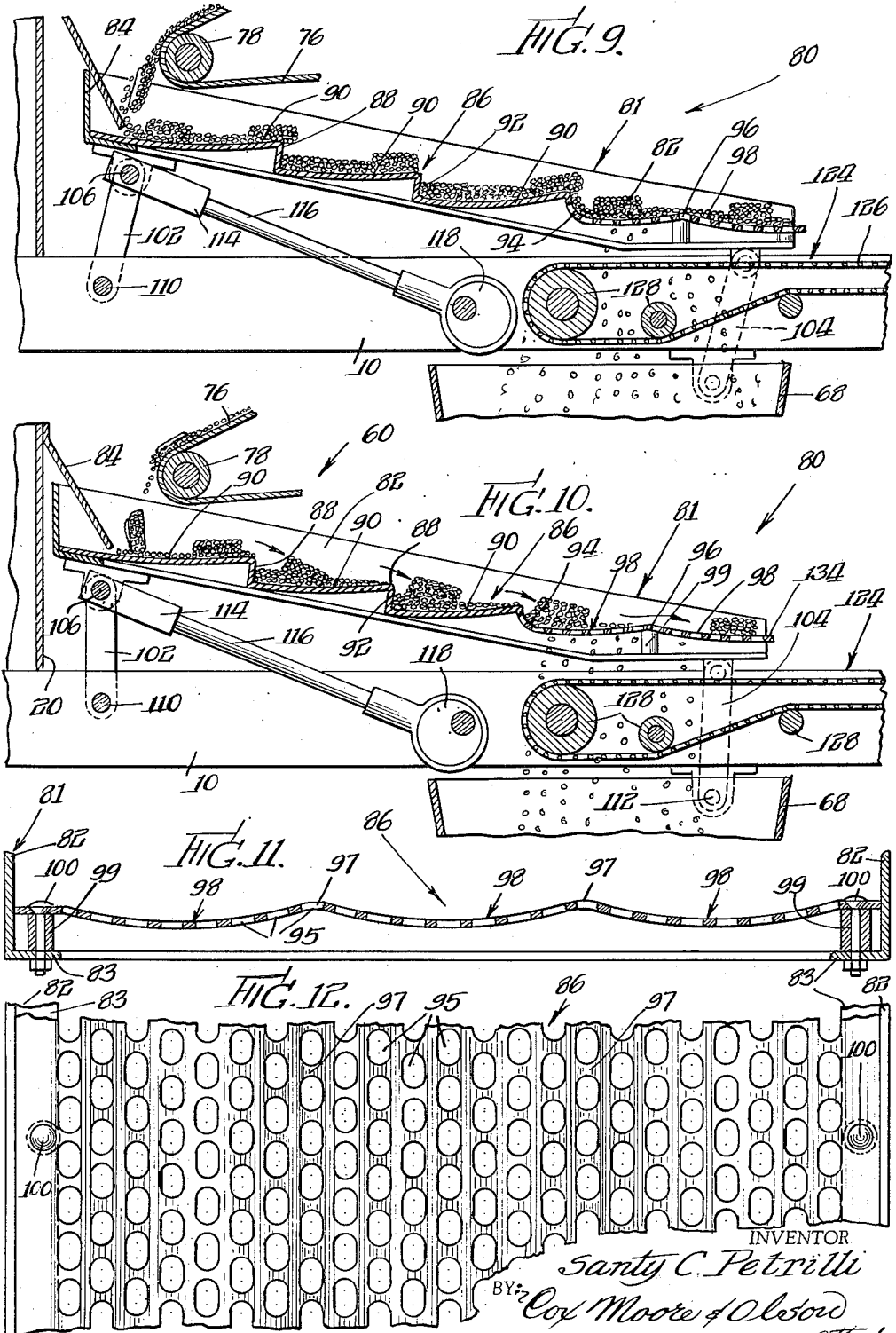

Patented Apr. 18, 1944

2,347,164

UNITED STATES PATENT OFFICE 2,347,164

APPARATUS FOR COATING CANDY

Santy C. Petrilli, Chicago, Ill., assignor to General Candy Corporation, Chicago, Ill., a corporation of Illinois Application December 29, 1941, Serial No. 424,700

16 Claims. (Cl. 107—1)

This invention relates to machinery for coating pieces of candy with nuts or other materials.

Generally stated, the object of the invention is to provide a novel and improved construction and arrangement whereby the candy will be more effectively coated, with less cost than heretofore, with greater speed and dispatch, by a continuous process whereby there will be less possibility of wasting or spoiling any of the materials used in the manufacture of confectionery of this kind.

Still another object of the invention is to retain the viscous substance that forms a part of the candy bar in a semiliquid state for a certain period hereinafter described.

It is also an object to provide certain details and features of construction and combinations tending to increase the general efficiency and desirability of a candy-coating machine of this particular character.

To the foregoing and other useful ends, the invention consists in matters hereinafter set forth and claimed and shown in the accompanying drawings, in which Figure 1 is a side elevational view of a candy machine embodying the principles of the invention;

Figure 2 is a longitudinal sectional view of a portion of the machine, being drawn on a larger scale than that shown in Figure 1;

Figure 3 is a detail sectional view taken on line 3—3 of Figure 4;

Figure 4 is a perspective view of the right-hand end of the machine as shown in Figure 1;

Figures 5, 6 and 7 are perspective views of the candy bar shown in different stages of development;

Figure 8 is a cross-sectional view of the candy bar taken on line 8—8 of Figure 7;

Figure 9 is a longitudinal fragmentary sectional view taken on line 9—9 of Figure 4;

Figure 10 is a similar view showing a different position of the parts as they appear in Figure 9;

Figure 11 is a transverse sectional view taken on line 11—11 of Figure 4; and

Figure 12 is a fragmentary plan view of a portion of the machine.

Figure 1:
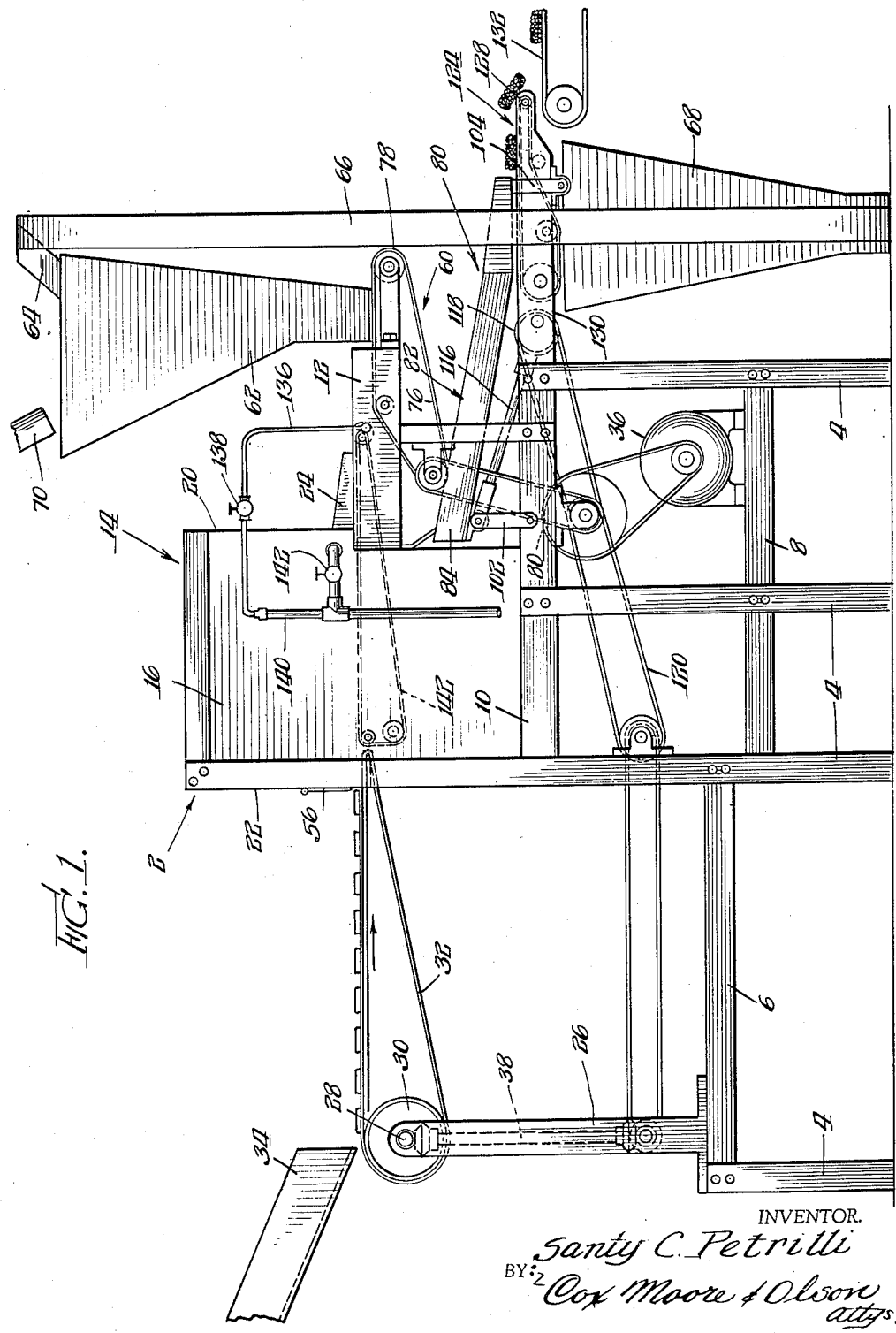

As thus illustrated the machine comprises a supporting frame 2 having a vertical leg 4, supporting platforms 6 and 8, a lower horizontal side frame member 10, and upper side members 12. A box-like compartment 14 comprises a front and rear wall 16, a top wall 18, and two side walls 20 and 22. In addition, the side wall 22 has a hood-like extension 24, as shown in Figure 2.

The platform 6, which may extend to the left of the machine, as shown in Figure 1, to any desired length, provides a support for a vertical upright bracket 26 which supports a cross shaft 28 that carries a large roll 30 around which an endless belt or conveyor 32 is driven.

An inclined chute 34 projects sticks of candy 35, which go to make up the core of the candy bar (see Figure 5), onto the endless belt or conveyor 32, where they may be arranged to lie longitudinally of the travel of the belt by either manual or mechanical means, not shown in the drawings.

Driving means for the movement of the above-mentioned conveyor comprises a motor 36 having suitable driving connection consisting of chains and sprockets which are geared to drive a vertical shaft 38 through suitable gearing connections to drive the roll 30 in a clockwise direction.

Positioned within the compartment 14 is a ledge 40 around which the conveyor belt 32 travels to carry the bars 35 into the chamber and to deposit them onto an endless wire-mesh belt 42 which travels around suitable supporting and driving rollers 44, all within the chamber 14. As the bars 35 are moved along they pass beneath a container 46 shown within the chamber 14, wherein they receive a coating of caramel preparation 48 or any other viscous preparation that will adhere to the surface of the candy bar 35. The caramel preparation flows down and over the bars in a continuous sheet, the excess passing through the wire-mesh conveyor 42 into a receiving container 50 which is positioned in the lower part of the chamber 14 directly under the container 46.

There is provided a mechanical device, as shown at 52, to return the caramel preparation from the container 50 to the container 46, which device is well known in the art and does not enter into the scope of this invention.

In addition there is provided a steam supply line 54 which supplies steam into the chamber 14, the steam being projected against the wall 20 which breaks up the force of the jets and helps to distribute it around the chamber 14. A hinged door 56 helps to retain the steam from escaping and also forms a movable member to allow accessibility to the inclosed mechanism.

As the thusly coated caramel bars emerge from the chamber 14 they are in a very viscous or sticky condition and as the outside air strikes them they have a tendency to become more difficult to manage, due to the thickening of the caramel. Upon approaching the end of the conveyor 42, which travels around the roller 56, the bars and the conveyor are subjected to another treatment of steam from the transverse steam pipe 58 held in position by supporting member 59, the steam retaining the caramel preparation in a semiliquid condition and preventing it from hardening until the bar is discharged downwardly onto a conveyor belt 60 that projects below the outer end of the chain mesh belt 42. Due to the steam contacting the caramel coated bars, it prevents them from adhering to the wire-mesh chain 42 and also prevents them from jamming up the roller 56 and its contact with the chain 42, and also retains the caramel on the bars in a semiliquid condition so that when they tumble off onto the conveyor 60 directly below they will be in a condition to pick up the ground, whole or broken pieces of nuts that travel along on this conveyor 60.

Means is provided in association with the discharge end of the enrobing mechanism whereby to tumble or precipitate the tacky caramel coated bar directly onto a downwardly traveling layer of nuts in such a manner that the tacky bar rides in an inclined downward direction along the surface of the layer or bed of nuts whereby to cause the nuts of the underlying layer to adhere to the undersurface of the bar, the remainder of the bar remaining tack and uncoated. This downwardly inclined traveling bed of nuts upon which the bars ride is utilized, in association with an underlying shaker bar mechanism for causing the downwardly riding bars to be discharged onto the upper surface of the shaking mechanism, whereby the bars are dropped dumped or precipitated onto the shaking bar in such a manner as to cause the tacky bar to be discharged through the mass of nuts constituting the underlying layer and also constituting the nuts discharged from the downwardly flowing layer whereby all surfaces of the tacky bar become coated with the nuts.

In addition, if there be any uncoated surfaces of the bar, such surfaces will be completely coated with nuts due to the subsequent movement of the bar as it is tumbled downwardly along the shaker mechanism which in turn contains a layer of surplus nuts or pieces of nuts. In this manner, by forming a downwardly traveling layer of nuts, by automatically dropping successive tacky bars onto this layer of nuts, and in causing such bar to ride downwardly on the layer of nuts and then discharge into an underlying shaker mechanism, both the downward discharge of the bar and the avalanche of nuts which will flow all around and onto the tacky bar as it is precipitated through the air on the shaker mechanism, will provide a complete and uniform coverage of the tacky bar with a minimum amount of nut feeding mechanisms and conveying mechanisms.

In carrying out the details of the foregoing simplified operation or process, I utilize the structure particularly shown in Figures 1, 2 and 4.

As will be seen in Figures 1 and 2, there is provided a hopper 62 having a supply chute 64 and an elevating device contained in the housing 66, which in turn is attached to the lower portion of the hopper 68. An additional supply line 70 may be used to supply nut meats to the hopper 62, which has its lower opening 72 overlying the conveyor belt 60, which passes beneath it. As the nut meats are spread transversely along this moving conveyor in alignment, they come in contact with an adjustable baffle plate 74 that regulates the thickness of the layer that will be retained on the conveyor as it travels to the left, as shown in Figure 2.

The conveyor 60 comprises a heavy canvas belt 76 traveling over rollers 78 which are properly driven from the motor 36 through chain and sprocket connections 80.

As the caramel coated bar 35 tumbles off the conveyor 42, it embeds itself into the inclined traveling layer of nut meats which adhere to the caramel coated bar along the bottom and sides of the bar.

Underlying the belt conveyor 42 is a shaker conveyor 80 comprising a frame 81 having side walls 82, lower flanges 83, and a rear wall 84, joined together to form a U-shaped structure which supports a base plate 86 formed of a sheet material extending between the side walls 82 and from the rear wall 84 inclined downwardly to the discharge end. The forward edges of the angle frame 81 are bent inwardly as at 83 to retain the bars and nut meats within the width of a lower conveyor hereinafter described.

The plate 86 in addition has formed a series of steps 88 which have a slightly curved portion 90 which extends transversely of the machine, and an angularly bent portion 92 which forms steps extending between the side frame walls 82. At 94 a short curved portion connects the portion 90 with a perforated section 96 which may be formed of the same continuous sheet of material that forms the stepped portion of the base plate 86. It will be noticed that the base 86 is a solid sheet of material up to the short curved section 94 and from there on being perforated as at 95, said perforated area extending between the side walls 82, the perforations 95 being in the shape of slots having their long dimension longitudinal of the machine and their short dimension transversely of the machine.

Viewing Figures 10, 11 and 12, it will be seen that the section having the perforations 95 is provided with a transverse ridge 96 which extends between the side walls 82, and also longitudinal ridges 97 formed at right angles to the ridges 96 and extending the longitudinal dimension of the perforated section. The squared portions bordered by these ridges 96 and 97 are formed as a concave area 98 wherein the candy bars are deposited and are shaken about to actually bump and press the nut meats into the caramel coated layer 48 of the candy bar.

In addition, the plate 86 is supported by spacing members 99 which may be held in clamped position by the bolt and nut 100 to hold the plate 86 in position in the frame member 81, as shown in Figure 11.

Attached to the under side of the shaker frame and supported thereby are two pairs of links 102 and 104 pivotally connected at 106 and 108 to the shaker frame 80 and having their opposite ends pivoted to the main frame 10 at 110 and 112. Also connected to the pivot pin 106 is a link 114 adjustably threaded to a rod 116 which is connected at its other end to an eccentric device 118 suitably driven by the motor 36 through a chain and sprocket arrangement 120.

A guard plate 122 is attached to the stationary compartment 14 and extends downwardly at an angle between the side walls 82 of the shaker frame 80. Situated directly below the shaker frame 80 is another endless chain-mesh conveyor 124 comprising a chain-mesh belt 126 and a series of rollers 128 suitably driven from the motor 36 by a series of chains and sprockets 130, and underlying this conveyor is the hopper 68 and the conveyor belt 132.

As shown in Figure 2, the shaker is shown in its rearmost position or, in other words, wherein it is positioned as far to the left as it will move, wherein the links 102 and 104 are substantially vertical. Upon movement of the eccentric the frame moves to the right and slightly downwardly, as shown in Figure 9, wherein the links 102 and 104 have pivotally moved about their pivots 110 and 112 to cause the shifting movement of the frame.

When the partially coated bars tumble or drop from the conveyor 76, they drop into the layer of peanuts supported by the base plate 86. As the shaker shifts from the position shown in Figure 2 to that shown in Figure 9 the bar is shifted to the right and nearer to the ledge 88 until the candy bar is projected over and into the next section 90 when the shaker frame is shifted reversely, as shown in Figure 10. This shaking is repeated in each section 90 until the candy bar is completely coated with nut meats, the portions 88 acting as pushing members, and the section 90 forming the bottom of individual troughs wherein the candy bar is shifted forwardly and backwardly to be thoroughly coated. As the candy bars are projected onto the perforated sections 98 the excess nut meats drop through the opening 95 and into the hopper 68 wherein they are fed upwardly into the upper hopper 62. Meanwhile the nut coated bars are bounced and tumbled about in the dish-like area 98 and the nut meats are firmly imbedded into the caramel coating so that when the bar which is slowly working its way forward reaches the edge 134 it will have a solid coating of nut meats surrounding the bar on all sides, and from this edge 134 it will drop onto the wire-mesh conveyor 124 which in turn deposits it onto the belt conveyor 132. It is then carried by the belt into the chocolate dipping chamber for further processing.

It will be seen from this arrangement that the shaker, being inclined downwardly and being provided with stepped sections, will cause the bar to gradually move forwardly and out of the machine but will also cause the bar to be retained in each section for a short period of time between the steps to be shifted about so that the caramel coating will be completely surrounded with nut meats.

It will also be noted that the arrangement of pivoted links causes the shaker to move forwardly or to the right and slightly downwardly, and then rearwardly and upwardly to cause the feeding forwardly of the unused nut meats and the bars. The connecting links 102 and 104 at no time assume a position very much to the left of a vertical line drawn through the pivots 110 and 112, for if they did the shaker would have too much of a downward thrust on its rearward movement which would prevent the candy bar and nut meats to travel forwardly as they should. The area 98 actually bumps the nuts into the bar which retains them in position, and also forms a bar that is relatively smooth and symmetrical.

It will be understood, as shown in Figure 1 of the drawings, that the different feed belts and other operative parts are suitably driven and timed in their respective operations so that the travel of the candy bars through the machine will be as uniform as possible to insure maximum capacity and relative low cost of production. In addition, a steam conduit line 136 connects to the conduit 58, the steam being controlled by a hand valve 138 that regulates the amount of steam from the main line 140. A valve 142 controls the amount of steam that enters the compartment 14 through the conduit 54.

Thus, attractive and comparatively cheap candy bars coated with nuts or other materials are produced at a reduced cost of manufacture, each candy bar comprising a core of suitable material which is first jacketed with a caramel preparation or equivalent, and this part of the apparatus is ordinarily known as the "enrober," and the instrumentalities by which the nuts or other materials are added to the caramel or other viscous material are known as the "coating machine."

Changes may be made in the form, construction, and arrangement of the several parts without departing from the spirit of the invention or sacrificing any of its numerous advantages, and the right is hereby reserved to make all such changes as fairly fall within the scope of the following claims.

I claim:

1. In combination with a conveyor adapted to convey a succession of sticky caramel coated candy bars along a substantially horizontal path, additional conveying mechanism having a downwardly inclined surface disposed below and spaced from the discharge end of said first mentioned conveyor, means for moving said conveying mechanism in a direction opposite to the direction of movement of the first mentioned conveyor, means for applying a continuous layer of nuts on the upper surface of said second mentioned conveyor, whereby said sticky candy bars as they discharge from the first conveyor discharge onto the upper surface of said downwardly traveling layer of nuts, and shaker mechanism disposed below and spaced from the discharge end of said downwardly inclined portion of said second mentioned conveyor, whereby said tacky caramel bars having nuts embedded on the underside thereof only will be discharged downwardly through the air through a mass of nuts falling from the continuous layer of said downwardly inclined portion, whereby to cause substantially all surfaces of said tacky bar to be covered with nuts, and means for operating said shaker mechanism whereby to feed the nut coated bars received thereonto in a direction away from the discharge end of said downwardly inclined conveyor and for discharging the same at a point remote therefrom.

2. In combination with an enrobing mechanism, an endless conveyor passing therethrough, a support and a steam nozzle disposed adjacent said support and discharging directly onto the discharge end of said conveyor, said steam nozzle being disposed slightly below the discharge end of said conveyor and spaced therefrom, whereby the candy bar as it discharges from said conveyor will contact the heated walls of said steam nozzle.

3. In combination with a conveyor belt passing along and upon which bars of sticky candy are adapted to be conveyed, a guide roller disposed at the discharge end of said belt and around which said belt is adapted to pass, a second conveying mechanism comprising a downwardly inclined length disposed below and spaced from the discharge end of said first mentioned conveyor mechanism, means for forming a layer of nuts on the upper surface of said second mentioned conveyor belt and a steam pipe disposed relatively close to the discharge end of said first mentioned conveyor belt and located in the path of travel in said bars discharging from said conveyor belt, whereby said bars contact said steam pipe, said steam pipe having steam discharge means facing the discharge end of said conveyor belt, whereby steam is discharged onto the undersurfaces of said tacky bars as they discharge from said first mentioned conveyor belt, said bars being discharged onto the layer of nuts on said downwardly inclined portion of said second mentioned conveyor belt.

4. In combination with a substantially horizontal conveyor carrying spaced tacky candy bars thereon, a second conveyor having a downwardly inclined portion located below and spaced from the discharge end of said first mentioned conveyor, means for forming a continuous layer of nuts on said second mentioned conveyor, means for driving said second mentioned conveyor in a direction reverse from the movement of said first mentioned conveyor, and shaker mechanism disposed below the discharge end of the downwardly inclined portion of the second mentioned conveyor and spaced therefrom, said shaker mechanism being inclined in a downward direction reverse to the direction of inclination of the inclined portion of said second mentioned conveyor.

5. In combination with a first conveyor having an upper horizontal portion adapted to carry a succession of sticky candy bars thereon, a shaker mechanism disposed below the discharge end of said conveyor, said shaker mechanism being slightly downwardly inclined and second conveying means disposed between said discharge end of said first mentioned conveyor means and said shaker mechanism and including a downwardly inclined portion adapted to receive sticky candy bars from the discharge end of said first conveyor and for discharging the same in a downwardly inclined direction beneath the discharge end of said first conveyor onto the upper end of said shaker mechanism and means for forming a layer of nuts on the upper surface of said downwardly inclined portion of said second conveyor, whereby to coat the undersurface of said tacky bars with nuts and whereby to provide a shower of nuts for discharging upon the candy bars as they are precipitated onto said shaker mechanism and whereby to provide a layer of nuts for the bottom of said shaker mechanism onto which said candy bars are tumbled as said bars pass along said shaker mechanism.

6. In combination with an endless conveyor providing an upper substantially horizontal stretch on which spaced tacky candy bars are fed, a second conveyor disposed opposite the discharge end of said first conveyor, said second conveyor comprising a horizontal portion and a downwardly inclined portion, said downwardly inclined portion underlying the discharge end of said first conveyor, means for moving said second conveyor in a direction reverse to the direction of movement of said first conveyor, means associated with said horizontal portion of said second conveyor for forming a continuous layer of nuts thereon, tumbling and conveying means disposed below the discharge end of said downwardly inclined portion of said second conveyor and adapted to receive nuts and candy bars discharged therefrom, said tumbling and conveying means being downwardly inclined in a direction away from said second conveyor and being provided with an upper surface adapted to tumble the nuts and bars deposited thereon progressively forwardly of said tumbling and conveying means.

7. In combination with a conveyor providing an upper substantially horizontal portion on which spaced tacky candy bars are conveyed, a second conveyor mechanism disposed opposite the discharge end of said first conveyor, said second conveyor mechanism comprising a horizontal portion and a downwardly inclined portion, said downwardly inclined portion underlying the discharge end of said first conveyor mechanism, means for moving said second mentioned conveyor in a direction reverse to the direction of movement of said first conveyor, means associated with said horizontal portion of said second conveyor mechanism for forming a continuous layer of nuts thereon, tumbling means disposed below the discharge end of said downwardly inclined portion of said second conveyor mechanism and adapted to receive nuts and candy bars discharged therefrom, said tumbling means being downwardly inclined in a direction away from said second conveyor mechanism and being provided with an upper surface formed longitudinally thereof with transversely disposed shoulders to tumble the nuts and bars deposited thereon progressively forwardly of said tumbling means, the portion of said tumbling means disposed between the foremost of said shoulders being foraminated and formed with spaced ridges disposed at substantial angles relative to said shoulders to provide a series of concaved foraminated shallow pockets into which the nuts and candy bars are successively tumbled as the same progress downwardly along the tumbling means.

8. In combination with an endless conveyor providing an upper substantially horizontal portion on which spaced tacky candy bars are fed, a second conveyor disposed opposite the discharge end of said first conveyor, said second conveyor comprising a horizontal portion and a downwardly inclined portion, said downwardly inclined portion underlying the discharge end of said first conveyor, means for moving said second conveyor in a direction reverse to the direction of movement of said first conveyor, means associated with said horizontal portion of said second conveyor for forming a continuous layer of nuts thereon, additional conveying means disposed below the discharge end of said downwardly inclined portion of said second conveyor and adapted to receive nuts and candy bars discharged therefrom, said additional conveying means being downwardly inclined in a direction away from said second conveyor and being provided with an upper surface adapted to tumble the nuts and bars deposited thereon progressively forwardly thereof, the discharge end of the upper surface of said additional conveying means being foraminated and said upper surface being formed with a series of progressively lower stepped portions providing vertical shoulders, the upper surfaces of said additional conveying means between said stepped portions being provided with a series of longitudinally disposed ridges providing intervening relatively shallow concave pockets along which the bars and nuts are adapted to tumble during the operation of the additional conveying means.

9. In combination with an enrober, a conveyor mechanism passing therethrough and including a horizontal stretch along and by which candy bars are conveyed, and steam discharging means disposed at the discharge end of said horizontal stretch for discharging steam onto the surface of the candy bar as it discharges from said enrober conveyor mechanism, and positioned so that said bars pass over and in contact with said discharging means whereby to maintain the bars tacky.

10. A shaker mechanism of the character described comprising an oscillatable support, means for oscillating the same, said support having upstanding sides and back and a sheet metal bottom occupying the space between said sides and back, said sheet metal bottom being provided with a series of transversely extending ridges providing substantially vertical shoulders, intervening shallow pan-shaped portions, the pan-shaped portions at the front of said bottom being perforated and those rearwardly thereof being imperforate, the perforated pan-shaped portions being provided with a series of ridges lying transversely to the vertically formed shoulders, whereby to provide shallow concavities between the ridges.

11. A shaker mechanism of the character described, comprising an oscillatable support having upstanding parallel sides and a connected back, a single sheet of metal disposed between the sides and back, said sheet being bent to provide a plurality of steps each forming a commodity article pushing shoulder, the metal of the sheet in advance of said vertical faces being bent to provide shallower steps of progressively decreasing vertical height, the metal of the discharge end of said sheet being perforated and being provided with spaced ridges extending transversely to said steps to provide a series of relatively shallow concave pockets of more or less rectangular formation.

12. In combination with an enrober providing a substantially closed box-like casing, conveying means disposed in said enrober, said enrober at its discharge end having an opening, a guard roller mounted at said opening, a pair of supports on which said roller is mounted, an endless conveyor adapted to pass around said roller in a manner to provide a substantially horizontal flight within said chamber to pass candy bars in spaced formation horizontally through said enrober and to discharge the same over said roller, support means adjacent said roller at each end thereof and a steam pipe mounted in said support means and disposed substantially below and in advance of said roller and parallel to the discharge end of said conveyor whereby said bars contactingly pass over said pipe when discharged from the endless conveyor, means for admitting steam to said pipe, said pipe having openings facing so as to discharge steam directly onto the discharge end of said conveyor and roller throughout the entire width thereof.

13. In combination with an endless conveyor having its upper reach disposed substantially horizontally and adapted to carry thereon sticky candy bars, means for operating said conveyor to discharge the sticky candy bars from one end of said conveyor, and a pipe disposed at the discharge end of said conveyor and directly in the path of the sticky candy bars as they are discharged from said conveyor whereby said candy bars pass over said pipe in contact with the walls thereof, and means for heating said pipe whereby to maintain the bars tacky as they are discharged from said conveyor.

14. In combination with an endless conveyor having its upper reach disposed substantially horizontally and adapted to carry thereon sticky candy bars, means for operating said conveyor to discharge the sticky candy bars from one end of said conveyor, and heating means disposed at the discharge end of said conveyor and positioned so that said bars contact with and pass over said heating means as they are discharged from said conveyor, whereby to maintain said bars tacky.

15. In combination with an endless conveyor having its upper reach disposed substantially horizontally and adapted to carry thereon sticky candy bars, means for operating said conveyor to discharge the sticky candy bars from one end of said conveyor, and heating means disposed at the discharge end of said conveyor and positioned so that said bars contact with and pass over said heating means as they are discharged from said conveyor, whereby to maintain said bars tacky, and said heating means being disposed below the discharge end of said conveyor and directly in the path of movement of the candy bars so as to positively separate said candy bars from the conveyor despite any tendency of said tacky bars to adhere to said conveyor, said heating means assisting in increasing the tackiness of said bars so as to assist in such separation.

16. In a device of the class described, in combination with an endless conveyor having its upper reach disposed substantially horizontally and upon which a series of tacky candy bars are adapted to be fed along, means disposed at the discharge end of said horizontal reach of said conveyor and adapted to be contacted by the candy bars as they reach said discharge ends whereby to tend to separate said bars from the conveyor and to permit the free discharge of said bars therefrom, and means for heating said discharge means whereby to maintain the tackiness of said bars to assist in the separation of said bars from said conveying means.

SANTY C. PETRILLI.